United States Patent
Litz

(10) Patent No.: US 11,597,256 B2
(45) Date of Patent: Mar. 7, 2023

(54) HEATING SYSTEM FOR A VEHICLE

(71) Applicant: Ford Global Technologies, LLC, Dearborn, MI (US)

(72) Inventor: Armin Litz, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 767 days.

(21) Appl. No.: 16/594,469

(22) Filed: Oct. 7, 2019

(65) Prior Publication Data
US 2020/0130469 A1 Apr. 30, 2020

(30) Foreign Application Priority Data

Oct. 31, 2018 (DE) .......................... 102018218652.9

(51) Int. Cl.
| | | |
|---|---|---|
| *B60H 1/22* | (2006.01) | |
| *B60S 1/02* | (2006.01) | |
| *B60S 1/54* | (2006.01) | |
| *H05B 3/84* | (2006.01) | |

(52) U.S. Cl.
CPC ............ *B60H 1/2226* (2019.05); *B60S 1/026* (2013.01); *B60S 1/54* (2013.01); *H05B 3/84* (2013.01)

(58) Field of Classification Search
CPC .......... B60H 1/2226; B60S 1/026; B60S 1/54; H05B 3/84
USPC .......................................................... 392/435
See application file for complete search history.

(56) References Cited

U.S. PATENT DOCUMENTS

| | | | | |
|---|---|---|---|---|
| 3,781,077 A | * | 12/1973 | Groth ................ | C03C 17/3642 |
| | | | | 359/360 |
| 10,914,946 B2 | * | 2/2021 | Fischer ............... | C03C 17/3644 |

FOREIGN PATENT DOCUMENTS

| | | |
|---|---|---|
| CN | 102795793 A | 11/2012 |
| CN | 106937414 A | 7/2017 |
| CN | 206485171 U | 9/2017 |
| FR | 2967117 A1 | 5/2012 |
| JP | 2013001611 A | 1/2013 |
| WO | 2010063434 A1 | 6/2010 |

OTHER PUBLICATIONS

"Infrared Radiators for Cosy Warmth in Passenger Compartments," www.infrabiotech.de/en/infrared-heater/passenger-compartment-warming.html, IBT.InfraBioTech GmbH, 3 pages, copyrighted 2014.
Kalvapalle, Rahul, "Bubbly Electric Cars, The Microlino is Inspired by Classic Italian Bubble Cars," Mar. 24, 2016, 7 pages.

* cited by examiner

*Primary Examiner* — Dana Ross
*Assistant Examiner* — Joe E Mills, Jr.
(74) *Attorney, Agent, or Firm* — Vichit Chea; Price Heneveld LLP

(57) ABSTRACT

A heating system for a vehicle is provided. In order to permit provision of efficient heating of a vehicle window pane of an electric vehicle, the system has two at least mainly transparent panes, wherein an outer pane is arranged on the outside of the vehicle and an inner pane is arranged on the inside of the outer pane to form an intermediate space, and at least one controllable infrared source is configured to irradiate infrared radiation into the intermediate space so that the infrared radiation at least partially irradiates the outer pane.

19 Claims, 3 Drawing Sheets

HEATING SYSTEM FOR A VEHICLE

FIELD OF THE DISCLOSURE

The present invention generally relates to vehicle heating, and more particularly relates to a heating system for heating a vehicle via a window pane.

BACKGROUND OF THE DISCLOSURE

In battery-operated electric vehicles, also referred to as battery electric vehicles (BEV), it is typically not possible to use excess heat from the engine for heating purposes as is possible for vehicles with an internal combustion engine. Therefore, a high proportion of the battery power must be used to heat the vehicle and to defrost the windshield, the side windows and the rear window. At extremely low ambient temperatures, e.g., between −17° C. and −30° C., the required heating power can be greater than the required drive power, such that the range of the vehicle may be considerably reduced as a result. In the case of a vehicle with a conventional constructed windshield which has an outer glass layer, an inner glass layer and a polyvinyl butyral (PVB) film lying between them, the required heating power can be in the region of 10-12 kW if defrosting is to occur by using a warm air stream. Furthermore, if it is also taken into account that the battery capacity decreases at low temperatures, the efficiency of battery-operated electric vehicles may be significantly less with respect to heating than that of vehicles with an internal combustion engine. A reduced heating capacity can be observed even with efficient internal combustion engines, so that the vehicles which are equipped with such engines also often have to rely on supplementary heating devices such as positive temperature coefficient (PTC) elements, fuel-operated heaters or heat pumps in order to heat the passenger compartment and/or defrost the window panes. The maximum heating power available by a PTC element is, however, comparatively low compared to the excess heat available with internal combustion engines. When extremely cold ambient air is sucked in, it may be difficult or impossible to heat this ambient air sufficiently with the available power in order to bring about effective defrosting of the vehicle window pane.

It would be desirable to provide for heating system that offers efficient heating of a vehicle window pane, particularly for an electric vehicle and other vehicles with a low level of drive heat.

SUMMARY OF THE DISCLOSURE

According to one aspect of the present disclosure, a heating system for a vehicle is provided. The heating system includes an outer mainly transparent pane arranged on an outside of the vehicle, an inner mainly transparent pane arranged on an inside of the outer pane to form an intermediate space, and at least one controllable infrared source configured to irradiate infrared radiation into the intermediate space so that the infrared radiation at least partially irradiates the outer pane.

According to a second aspect of the present disclosure, a heating system for a vehicle is provided. The heating system includes an outer mainly transparent pane arranged on an outside of the vehicle, an inner mainly transparent pane arranged on an inside of the outer pane to form an intermediate space, and at least one controllable infrared source configured to irradiate infrared radiation into the intermediate space so that the infrared radiation at least partially irradiates the outer pane, the at least one infrared source is configured to irradiate infrared radiation into the intermediate space so that the infrared radiation at least partially irradiates the inner pane, wherein the heating system is configured such that at least part of the infrared radiation is reflected from at least one of the outer and inner panes to the other of the outer and inner panes.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the different figures, identical parts are always provided with the same reference symbols, for which reason they are generally also described only once.

Figure 1:
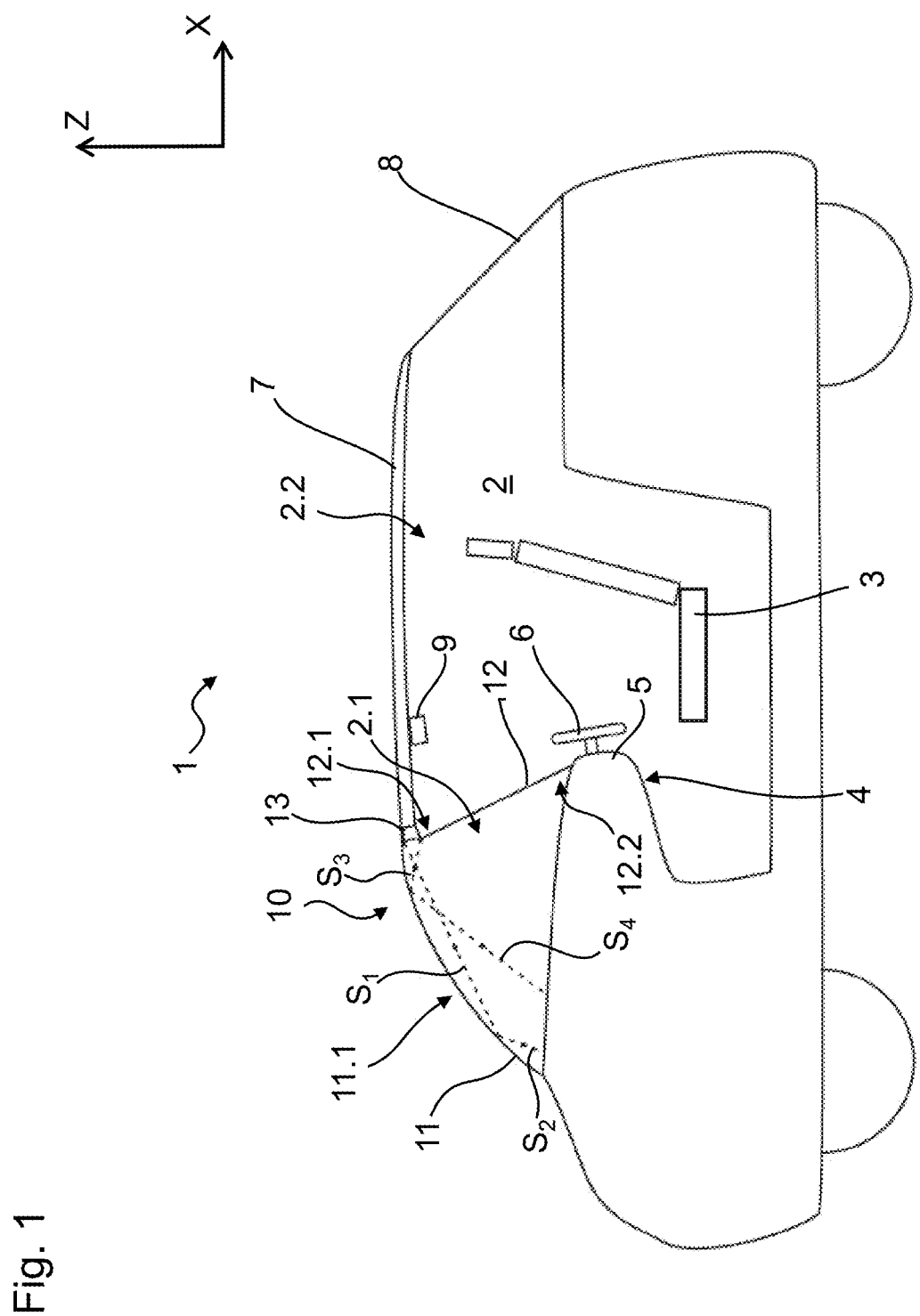
FIG. 1 is a lateral sectional illustration of a motor vehicle with a heating system according to a first embodiment.

FIG. 1 shows a lateral sectional illustration of a motor vehicle 1, in this example a wheeled motor vehicle configured as a passenger car. The motor vehicle 1 has a passenger compartment 2 in which seats 3 are arranged. For reasons of simplicity, a two-seater motor vehicle 1 is illustrated, with it being understood that it could also be a passenger car with more than two seats 3 or a truck, bus or van. A dashboard 5 and a steering wheel 6 are arranged on a front bracket 4. The passenger compartment 2 is bounded in the upward direction by an inner roof lining 7, in the forward direction (on the left in the plane of the drawing) by a windshield 11, to the sides by side windows (not illustrated here) and to the rear (on the right in the plane of the drawing) by a rear window pane 8.

In order to heat, for example defrost, the windshield 11, a heating system 10 is provided. An inner pane 12 which is assigned to the heating system 10 is arranged inside the passenger compartment 2. That is to say, the windshield 11 forms an outer pane, viewed from which the inner pane 12 is arranged on the inside. This inner pane 12 is at least mainly transparent and can be embodied, for example, as a pane made of (safety) glass or plastic. An upper edge 12.1 bears against the inner roof lining 7, and a lower edge 12.2 bears against the front bracket 4. Lateral edges can bear, for example, on an A pillar (not illustrated) or other adjacent vehicle internal surfaces depending on the design. It is optionally possible for a sealing element for at least approximately airtight connection to be provided on the edge side. A, for example air-filled, intermediate space 2.1 is formed between the windshield 11 and the inner pane 12, which intermediate space 2.1 is separated from a vehicle occupant area 2.2 lying behind it along the X axis and having the seats 3 arranged therein. The inner pane 12 impedes an exchange of air between the intermediate space 2.1 and the vehicle occupant area 2.2 without necessarily completely preventing it. A certain degree of exchange of air is, on the one hand, virtually unavoidable and on the other hand can prevent excessive differences in pressure.

An infrared radiator 13 is arranged on the upper side of the windshield 11 and of the inner pane 12. The infrared radiator 13 is configured to irradiate infrared radiation into the intermediate space 2.1. Overall, the infrared radiation which is emitted by the infrared radiator 13 can be considered to be a beam or field of radiation with which primarily the field of vision 11.1 of the driver on the windshield 11 is irradiated. Only a few rays $S_1$-$S_4$ are shown here by way of example. A first ray $S_1$ is transmitted to a lower part of the field of vision 11.1. A part of the first ray S1 is absorbed by the windshield 11 and therefore contributes to heating it, while another part is reflected as a second ray $S_2$ and impacts on the upper side of the bracket 4. There, it is essentially absorbed and contributes to heating the bracket 4, which also subsequently brings about heating of the air in the intermediate space 2.1. This can in turn assist, on the one hand, the heating of the windshield 11, but on the other hand also that of the inner pane 12. This in turn contributes to protecting the inner pane 12 against misting up. Correspondingly, a third ray $S_3$ is transmitted to an upper part of the field of vision 11.1, where it is partially absorbed and partially reflected as a fourth ray $S_4$ to the upper side of the bracket 4.

The inner pane 12 can, on the one hand, serve to keep warm air in the intermediate space 2.1 so that, under certain circumstances, a higher temperature can be formed there than in the vehicle occupant area 2.2, which is, under certain circumstances, more pleasant for the vehicle occupants. On the other hand, the inner pane 12 can ensure that the intermediate space 2.1 serves, as it were, as insulation for warm air which is present in the vehicle occupant area 2.2, so that it can less easily output heat into the surroundings of the motor vehicle 1. However, it is also to be borne in mind that the inner pane 12 not only minimizes or completely prevents an exchange of heat by convection but also partially reflects infrared radiation, which also reduces an exchange of heat between the vehicle occupant area 2.2 and the intermediate space 2.1.

In addition to its thermal function, the inner pane 12, or a part thereof, is also used as a projection surface for an HUD unit 9 which is arranged on the inner roof lining 7. As a result, a wide variety of information items can be input directly into the driver's field of vision. It is also additionally conceivable that a user can input control commands by touching the surface of the inner pane 12. In this context, for example the position of a finger on the inner pane 12 could be detected by use of optical sensors. Of course, other types of sensors are also possible. In the present example, the inner pane 12 is inclined with its upper edge 12.1 away from the driver, which in turn results in the necessary mounting of the HUD unit 9 level with the upper edge 12.1 of the inner pane 12, on the inner roof lining 7.

Figure 2:
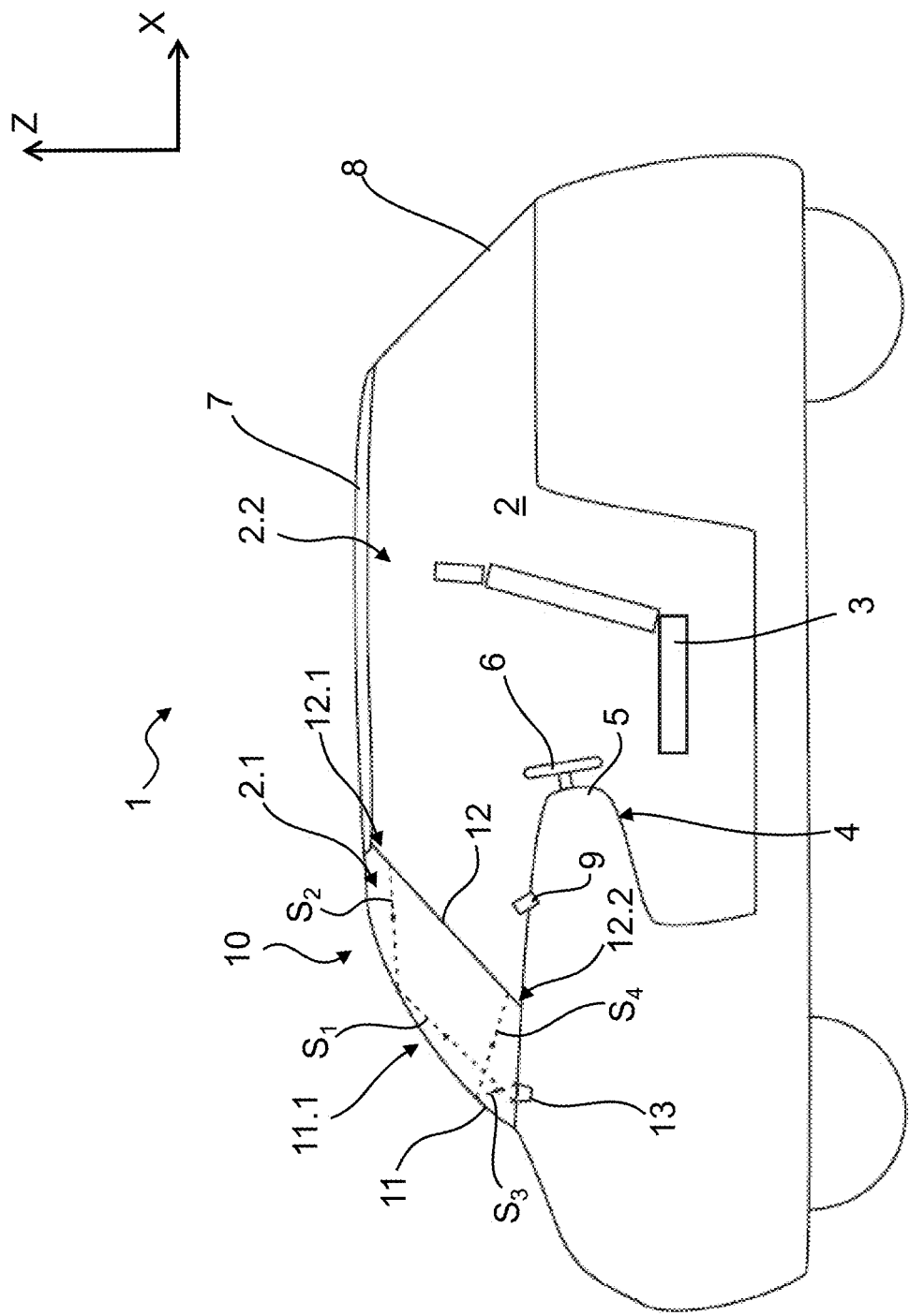
FIG. 2 is a lateral sectional illustration of a motor vehicle with a heating system according to a second embodiment.

Alternatively, the inner pane 12 can also be inclined with its upper edge 12.1 toward the driver and run, for example, at a small angle or even partially in parallel with respect to the windshield 11. Such an embodiment is shown in FIG. 2, which largely corresponds to the embodiment in FIG. 1 and in this respect is not explained once more. The inner pane 12 is inwardly inclined here, that is to say toward the driver, which results inter alia, in the intermediate space 2.1 having a significantly smaller volume than in FIG. 1. An infrared radiator 13 is arranged on the lower side of the two panes 11, 12, such that it may be with the lower edge 12.2 of the inner pane 12. The infrared radiator 13 is in turn configured to irradiate primarily the field of vision 11.1, wherein only a few rays $S_1$-$S_4$ are in turn illustrated here by way of example. A first ray $S_1$ is transmitted to the upper part of the field of vision 11.1, where it is partially absorbed and partially reflected as a second ray $S_2$. This second ray $S_2$ impinges on the inner pane 12 and brings about direct heating thereof. Correspondingly, a third ray $S_3$ is transmitted to the lower part of the field of vision 11.1, where it is partially absorbed and also partially reflected as a fourth ray $S_4$ to the inner pane 12. That is to say, in this embodiment the inner pane 12 is decisively heated by thermal radiation, while in the first exemplary embodiment it is heated to a greater degree by convection or thermal conduction. It is to be noted that a corresponding arrangement of an infrared radiator 13 in which the inner pane 12 is heated by reflected infrared rays $S_2$, $S_4$ would also be possible in the embodiment in FIG. 1. In contrast to the first embodiment, an arrangement of the HUD unit 9 on the inner roof lining 7 is less suitable in the embodiment shown in FIG. 2. Therefore, in this embodiment the HUD unit 7 is arranged on the upper side of the bracket 4.

Figure 3:
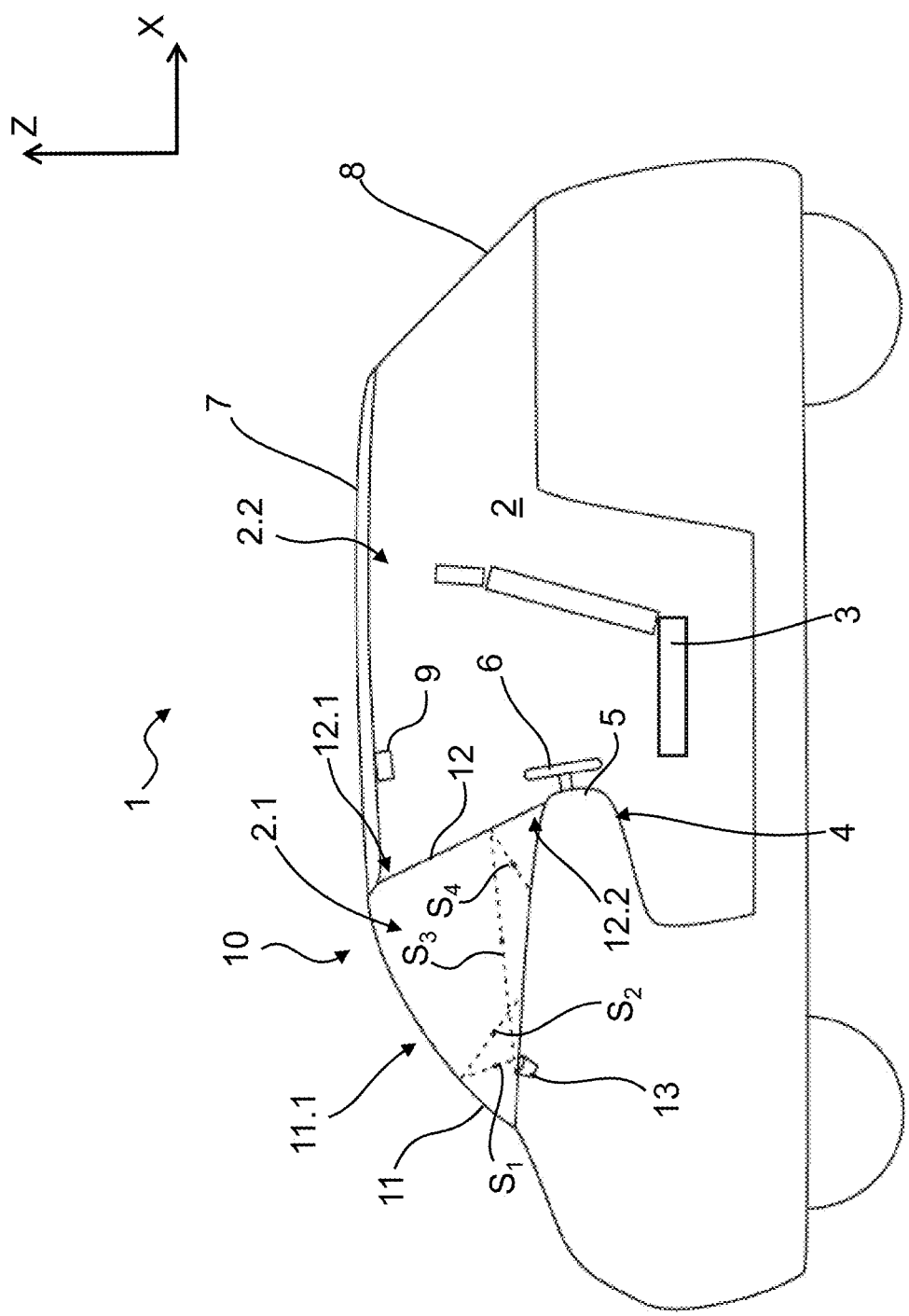
FIG. 3 is a lateral sectional illustration of a motor vehicle with a heating system according to a third embodiment.

FIG. 3 shows a motor vehicle 1 with a third embodiment of a heating system 10. With respect to the configuration of the windshield 11 and the inner pane 12, said heating system is identical to the embodiment shown in FIG. 1. However, an infrared radiator 13 is arranged on the lower side of the two panes 11, 12 in an upper region of the bracket 4. In contrast to the exemplary embodiments in FIG. 1 and FIG. 2, it is configured to irradiate directly both the windshield 11 including the field of vision 11.1, and the inner pane 12. This is illustrated in turn by way of example by use of a number of rays $S_1$-$S_4$. A first ray $S_1$ is transmitted to the lower part of the field of vision 11.1, where it is partially absorbed and partially reflected as a second ray $S_2$ in the direction of the upper side of the bracket 4. A third ray $S_3$ is transmitted to the inner pane 12, where it is partially absorbed and also partially reflected as a fourth ray $S_4$ to the surface of the bracket 4. In this embodiment, the inner pane 12 is also decisively heated by thermal radiation. Whereas here an individual infrared radiator 13 which irradiates both the windshield 11 and the inner pane 12 is illustrated, it would also alternatively be possible to use two separate infrared radiators 13, one of which irradiates the windshield 11 and the other the inner pane 12.

It is to be noted that the features and measures which are specified in the following description individually can be combined with one another in any desired technically appropriate way and indicate further refinements of the disclosure. The description additionally characterizes and specifies the disclosure, in particular in conjunction with the figures.

The disclosure makes available a heating system for a vehicle. The vehicle may be a road vehicle, in particular a motor vehicle such as a passenger car or truck. In particular the vehicle can be a battery-operated electric vehicle, if appropriate also a vehicle with a highly efficient internal combustion engine or a vehicle with a hybrid drive. The heating system is provided, in particular, for vehicles in which the drive system generates only low quantities of waste heat. Generally, the heating system can have various components which either serve actively for heating at least part of the vehicle or else as it were passively assist the heating or make the heating more efficient or at least influence it.

The heating system has two at least mainly transparent panes, wherein an outer pane is arranged on the outside of the vehicle and an inner pane is arranged on the inside of the outer pane to form an intermediate space. The panes are embodied in an at least mainly transparent fashion, which includes the possibility that they can be composed at least partially of tinted or self-tinting material. The outer pane can be manufactured from conventional materials which are known for vehicle window panes, for example glass, plastic or a combination thereof. Possible materials for the inner pane are, for example, all materials which are also suitable and permissible for the outer pane. However, construction from more strongly flexible materials, for example plastic, would also be possible alongside these. In particular the outer pane, if appropriate, however also the inner pane, can be implemented with a composite design—such as with two glass layers which are connected by an intermediate plastic film. Both panes may normally be at least mainly planar, e.g., embodied in a plate-like fashion, wherein for reasons of saving space a low material thickness is preferred, which, however, has to ensure necessary mechanical stability.

The outer pane is arranged on the outside of the vehicle and is therefore in direct contact with the ambient air. The outer pane can be oriented here in any desired relationship with the direction of travel of the vehicle, which includes the possibility that the outer pane is an upwardly pointing outer pane which forms part of a roof window. The inner pane is arranged on the inside of the outer pane, that is to say is arranged toward the inside of the vehicle with respect to the outer pane. In this context, the inner pane is arranged with respect to the outer pane in such a way that an intermediate space is formed between the two panes. In other words, at least not the entire surface of the inner pane bears on the outer pane but instead is spaced apart therefrom at least in certain areas. The intermediate space, which can more accurately be referred to as an intermediate space which remains empty, is normally filled with air. Within the scope of the disclosure, it would, however, also be possible for the intermediate space to be filled or (partially) evacuated with another gas or gas mixture. The magnitude of the intermediate space or the distance between the two panes can be selected to be different according to other embodiments. For example, it would be possible for the distance to be of the order of magnitude of the thickness of the outer pane and/or of the inner pane. It would therefore be possible, for example, for each pane to have a thickness of less than 1 cm, while the distance between the two panes is several centimeters at least in certain areas.

The heating system has at least one infrared source which can be activated and which is configured to irradiate infrared radiation into the intermediate space so that the infrared radiation at least partially irradiates the outer pane. The at least one infrared source can be activated, one could also say can be switched on (and switched off again). Furthermore, the at least one infrared source can also be open-loop or closed-loop controlled with respect to its power output. It can, for example, be operated electrically. In addition, it is also possible for the at least one infrared source to be operated by a normally gaseous or fluid fuel. The infrared source is configured to output infrared radiation, which basically includes the possibility that the infrared source partially also outputs radiation from other frequency ranges, for example visible light. The infrared source can have one or more filters, which prevent a certain frequency range, which is generated primarily, from being irradiated outward.

The at least one infrared source is specifically configured to irradiate infrared radiation into the intermediate pane between the two panes so that the infrared radiation at least partially irradiates the outer pane. This includes both the possibility of direct irradiation and of indirect irradiation with intermediately occurring reflection and/or refraction of the infrared radiation. In terms of the beam path there is provision here that the infrared radiation propagates within the intermediate space before it impinges on the outer pane for the first time. In general, three different processes, specifically absorption, refraction and reflection of the infrared radiation, occur in the region of the outer pane, wherein the proportions of the individual processes depend on different factors such as the wavelength of the infrared radiation, the angle of incidence with respect to the outer pane and the material of the outer pane. Absorption of the infrared radiation occurs at least proportionally, as a result of which the outer pane is heated in the irradiated region. It is advantageous here that no intermediately arranged medium, such as for example a warm air stream, is at least not primarily required in order to heat the outer pane but rather that the outer pane can be heated directly and in a targeted fashion. As a result, the heating system according to the disclosure has a high level of efficiency.

The presence of the inner pane, which is arranged on the inside of the outer pane, is of considerable advantage. The inner pane can have advantageous effects in different ways. On the one hand, the inner pane can reflect infrared radiation which originates from a vehicle occupant area which adjoins the inside of the inner pane, and it can thus reduce the thermal irradiation to the surroundings. Conversely, it is also possible for the inner pane to reflect infrared radiation which originates from or is reflected by the outer pane back in the direction of the outer pane, and therefore promotes the heating of the outer pane. Furthermore, the inner pane at least reduces the exchange of heat by convection between the intermediate space and the interior region of the vehicle. In general, the inner pane does not close off the intermediate space in a completely gas-tight fashion with respect to the interior region of the vehicle, even if this would in principle be conceivable. A certain exchange of gas or air can also be advantageous in order to prevent excessive pressure differences building up. Furthermore, through such an exchange it is possible to avoid dead water regions forming, that is to say spaces in which moist warm air collects. However, the inner pane preferably bears at its edge, if appropriate, with intermediate arrangement of a sealing element on an adjacent inner surface of the vehicle. This inner surface could be, for example, the inner roof lining of the vehicle, a dashboard or the like. In addition, it would also be conceivable that the inner pane and outer pane are connected to one another at the edge by a sealing element, as it were in the manner of a double glass pane. Direct contact of the inner pane with the outer pane or with a part of the bodywork which is in contact with the surroundings of the vehicle should, however, be avoided since they can have a considerable temperature difference (30-40 K depending on the external temperature) from the inner pane. In this respect, an intermediately arranged sealing element can also serve to thermally insulate the inner pane. In any case, convection between the vehicle occupant area and the intermediate space can be reduced by the inner pane, if appropriate, to a negligible amount. This can in turn, on the one hand, serve to minimize outputting of heat from the vehicle occupant area to the surroundings of the vehicle. On the other hand, it is possible that as a result of the operation of the at least one infrared source the air (or some other gas) in the intermediate space heats up, specifically up to a temperature which lies above that in the vehicle occupant area. In this case, it is advantageous if the air which is heated up in this way cannot escape in an uncontrolled way into the vehicle occupant area but rather remains at least for a relatively long time between the two panes and therefore contributes to heating the outer pane, and also the inner pane.

The at least one infrared source is preferably configured to irradiate infrared radiation into the intermediate space so that the infrared radiation at least partially irradiates the inner pane. That is to say both the outer pane and the inner pane are irradiated. This in turn includes the possibility of direct irradiation as well as that of indirect irradiation, after refraction and/or reflection. Irradiation of the inner pane is advantageous since although the latter does not have a tendency to ice up it could however become misted up, which may adversely affect the view of the vehicle occupants or of the driver toward the outside.

The heating system may be advantageously configured in such a way that at least part of the infrared radiation is reflected from at least one pane to the other pane. In this context, a reflection or a plurality of reflections are conceivable so that the infrared radiation is as it were reflected to and fro between the inner pane and the outer pane. Single or multiple reflection of this kind can be implemented by suitable orientation of the inner pane and of the outer pane with respect to one another and suitable orientation of the at least one infrared source. Of course, partial absorption of the infrared radiation also occurs in parallel with each reflection, so that both panes can be heated without there being primarily any appreciable heating of air or gas in the intermediate space.

The heating system may be configured in such a way that infrared radiation is irradiated from at least one infrared source to the outer pane in such a way that the infrared radiation is reflected from the outer pane at least partially to the inner pane. With this configuration, the infrared radiation is, at it were, primarily irradiated to the outer pane and is partially reflected from there to the inner pane. Owing to the partial absorption of the outer pane, the infrared radiation has a greater intensity when it impinges on the outer pane than when it impinges on the inner pane. This corresponds to the general requirement that the outer pane be heated up primarily in order to defrost it or to prevent it from misting up.

Alternatively or additionally, the at least one infrared source can be configured to irradiate both panes directly with infrared radiation. In this context, for example, it is possible to use a plurality of infrared sources, some of which irradiate the outer pane directly and others irradiate directly the inner pane. However, it would also be conceivable for an individual infrared source to irradiate the infrared radiation over a large spatial angular range which covers both panes, or in two separate spatial angular ranges, one of which corresponds to the inner pane and the other to the outer pane. In this context, optical elements such as prisms or mirrors can be used to achieve a desired orientation of the infrared radiation.

At least one infrared source can be arranged on the upper side of the panes. "On the upper side" means here that the infrared source is arranged either above the panes or in an upper edge region of the panes. That is to say, the infrared source is generally arranged in the region of the inner roof lining of the vehicle, but if appropriate also in the upper region of a mount of the outer pane. Alternatively or additionally, at least one infrared source can be arranged on the lower side of the pane, that is to say underneath the panes or in a lower edge region of the panes. The corresponding infrared source can be arranged, for example, in a bracket underneath the panes or in the lower region of a mount of the outer pane.

Generally, the outer pane can be a vehicle window pane which is oriented in any desired way; in the case of a passenger car it can be, for example, a side window pane or rear window pane or, as already mentioned above, a roof window. In particular, the outer pane can be a windshield.

The windshield is generally a pane which is arranged in the direction of travel or movement of the vehicle. That is to say, a driver of the vehicle generally requires an unimpeded view through the windshield, at least through part of the windshield which corresponds to his field of vision. This part should be kept free of ice and condensing air moisture in a particularly reliable way and particularly quickly after the start of the journey. For this reason, it is preferred that at least one infrared source is configured to irradiate infrared radiation at least mainly into a region of the outer pane which corresponds to a field of vision of the driver of the vehicle. It could also be said that the region of the outer pane which corresponds to the field of vision is irradiated directly by at least one infrared source, specifically in such a way that the majority of the overall irradiated infrared radiation is directed into this region. Alternatively or additionally there can be provision that the intensity of the radiation of at least one infrared source is at a maximum in this region.

Different selections can be made for the geometric profile of the inner pane, bearing in mind that this should not involve any adverse effect on the necessary room for movement of the vehicle occupants. Furthermore, it is to be borne in mind that when the outer pane is a windshield, the inner pane is necessarily located in the driver's field of vision, for which reason it should be arranged in such a way that the probability of distracting reflections, for example as a result of sunlight, is as low as possible. There can generally be provision that the inner pane is inclined outward or inward. This applies, in particular, even when the outer pane is a windshield. Such an outer pane is generally inclined inward to a greater or a lesser extent in motor vehicles. If the inner pane is also inclined inward, its profile can correspond more or less to that of the outer pane. However, significant deviations therefrom are conceivable, for example in such a way that the outer pane is curved in its entirely while the inner pane is of planar or flat design. However, even in the case of an inwardly inclined outer pane the inner pane can also be inclined outward.

In addition to its function, as described above, for screening the intermediate space off from the vehicle occupant area and from the reflection of infrared radiation, the inner pane can optionally also be used for other purposes. According to one advantageous refinement, the inner pane has a projection surface for a display system. This can be, in particular, a projection surface for an HUD (head up display) unit or for an infotainment system. It is possible, in particular, in the case of embodiments in which the outer pane is a windshield. Since the inner pane is at least mainly of transparent design and can be arranged at least partially in the driver's field of vision, it can be used satisfactorily for a head up display or some other display system. In this context, various types of information can be displayed in the driver's field of vision using an image-producing unit and an optics module. Depending on the inclination of the inner pane, the image-producing unit can be arranged either below or above. If the inner pane is inclined inward similarly to the outer pane (that is to say the windshield), that is to say toward the driver, the image-producing unit can be arranged below, in the region of the dashboard. If the inner pane is inclined outward, that is to say away from the driver, the image-producing unit can be arranged above, in the region of the inner roof lining of the vehicle. Under certain circumstances, the projection surface can be used not just for displaying but also for inputting in such a way that by use of suitable, for example optical, sensors it is detected whether one of the vehicle occupants touches a specific part of the projection surface. This touch can then be interpreted as an input into an HMI (Human Machine Interface) unit.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A heating system for a vehicle comprising:
an outer mainly transparent pane arranged on an outside of the vehicle;
an inner mainly transparent pane arranged on an inside of the vehicle inwards of the outer pane and spaced from the outer pane to form an intermediate space that is air-filled; and
at least one controllable infrared source configured to irradiate infrared radiation into the intermediate space so that the infrared radiation at least partially irradiates the outer pane.

2. The heating system according to claim 1, wherein the at least one infrared source is configured to irradiate infrared radiation into the intermediate space so that the infrared radiation at least partially irradiates the inner pane.

3. The heating system according to claim 1, wherein the heating system is configured such that at least part of the infrared radiation is reflected from at least one of the outer and inner panes to the other of the outer and inner panes.

4. The heating system according to claim 1, wherein the heating system is configured such that infrared radiation is irradiated from at least one infrared source to the outer pane such that the infrared radiation is reflected from the outer pane at least partially to the inner pane.

5. The heating system according to claim 1, wherein the at least one infrared source is configured to irradiate both outer and inner panes directly with infrared radiation.

6. The heating system according to claim 1, wherein the at least one infrared source is arranged on the upper side and/or lower side of the outer and inner panes.

7. The heating system according to claim 1, wherein the outer pane is a windshield.

8. The heating system according to claim 1, wherein the at least one infrared source is configured to irradiate infrared radiation at least mainly into a region of the outer pane which corresponds to a field of vision of a driver of the vehicle.

9. The heating system according to claim 1, wherein the inner pane is inclined outward or inward.

10. The heating system according to claim 1, wherein the inner pane has a projection surface for a display system.

11. A heating system for a vehicle comprising:
an outer mainly transparent pane arranged on an outside of the vehicle, wherein the outer panel is a windshield;
an inner mainly transparent pane arranged on an inside of the vehicle inwards of the outer pane and spaced from the outer pane to form an intermediate space that is air-filled; and
at least one controllable infrared source configured to irradiate infrared radiation into the intermediate space so that the infrared radiation at least partially irradiates the outer pane, the at least one infrared source is configured to irradiate infrared radiation into the intermediate space so that the infrared radiation at least partially irradiates the inner pane, wherein the heating system is configured such that at least part of the infrared radiation is reflected from at least one of the outer and inner panes to the other of the outer and inner panes.

12. The heating system according to claim 11, wherein the heating system is configured such that infrared radiation is irradiated from the at least one infrared source to the outer pane such that the infrared radiation is reflected from the outer pane at least partially to the inner pane.

13. The heating system according to claim 11, wherein the at least one infrared source is configured to irradiate both outer and inner panes directly with infrared radiation.

14. The heating system according to claim 11, wherein at least one infrared source is arranged on the upper side and/or lower side of the outer and inner panes.

15. The heating system according to claim 11, wherein the at least one infrared source is configured to irradiate infrared radiation at least mainly into a region of the outer pane which corresponds to a field of vision of a driver of the vehicle.

16. The heating system according to claim 11, wherein the inner pane is inclined outward or inward.

17. The heating system according to claim 11, wherein the inner pane has a projection surface for a display system.

18. The heating system according to claim 11, wherein the inner pane extends between a dashboard and an inner roof lining.

19. The heating system according to claim 1, wherein the inner pane extends between a dashboard and an inner roof lining.

* * * * *